Sept. 7, 1926.

C. R. CARPENTER

THERMOSTATIC MECHANISM

Filed April 23, 1923

1,599,208

INVENTOR
CHARLES R. CARPENTER
BY Paul, Paul & Moore
ATTORNEYS

Patented Sept. 7, 1926.

1,599,208

UNITED STATES PATENT OFFICE.

CHARLES R. CARPENTER, OF MINNEAPOLIS, MINNESOTA, ASSIGNOR TO SILAS McCLURE, OF MINNEAPOLIS, MINNESOTA.

THERMOSTATIC MECHANISM.

Application filed April 23, 1923. Serial No. 634,036.

This invention relates to new and useful improvements in thermostatic mechanisms adapted to be positioned within spaces subject to temperature fluctuations and to be responsive thereto in order to control or effect movements of other devices such as valves, dampers, switches, etc. This invention more specifically relates to improvements in thermostatic mechanisms of the type employing a flexible element as the thermostatically movable part thereof such, for example, as that set forth in the prior co-pending application of Silas McClure, Serial Number 614,640, filed January 24, 1923, now matured into Patent No. 1,472,725, issued October 30, 1923. Such thermostatic mechanisms broadly include a tube and flexible element of different coefficients of expansion which will accurately function when the tube assumes a path other than straight. This type of thermostatic mechanism is particularly useful for controlling valves supplying gas to ovens for the reason that the element may extend from the oven to a valve adjacent an oven burner and the effective length of the element is not confined to that of a single straight line but may assume a grid-like, convoluted or tortuous path within the oven. This novel improvement broadly resides in the combination of such a flexible element and tube with means for overcoming any tendency of the flexible element to slackness which may impair the accurate responsiveness of the relatively movable element to temperature changes. In thermostatic mechanisms of this type, the flexible element has a running guiding fit within its complementary tube and there may be some tendency toward slight inaccuracies under certain conditions. For example, the flexible element may be closely against the inside face of the tube at a curve or bend under the one thermal condition and may move slightly to the outside face of such a curve under other thermal conditions. By the employment of tension means, the flexible element is constantly held in one position so that the full effect of its thermostatic action is accurately obtained.

To afford a clear explanation of the invention, this novel thermostatic mechanism is shown in conjunction with a gas valve of the type set forth in a prior co-pending application jointly filed by Silas McClure and Stanley W. Palmer, Serial Number 614,639, filed January 24, 1923.

The object therefore of this invention is to provide an improved thermostatic mechanism.

Other objects of the invention will more fully appear from the following description and the accompanying drawings and will be pointed out in the annexed claims.

In the accompanying drawings, there has been disclosed a structure designed to carry out the objects of the invention, but it is to be understood that the invention is not confined to the exact features shown, as various changes may be made within the scope of the claims which follow.

In explaining the construction and operation of this novel mechanism, the valve structure and its associated tubular member and element may first be explained and thereafter the novel improvement.

Figure 1:
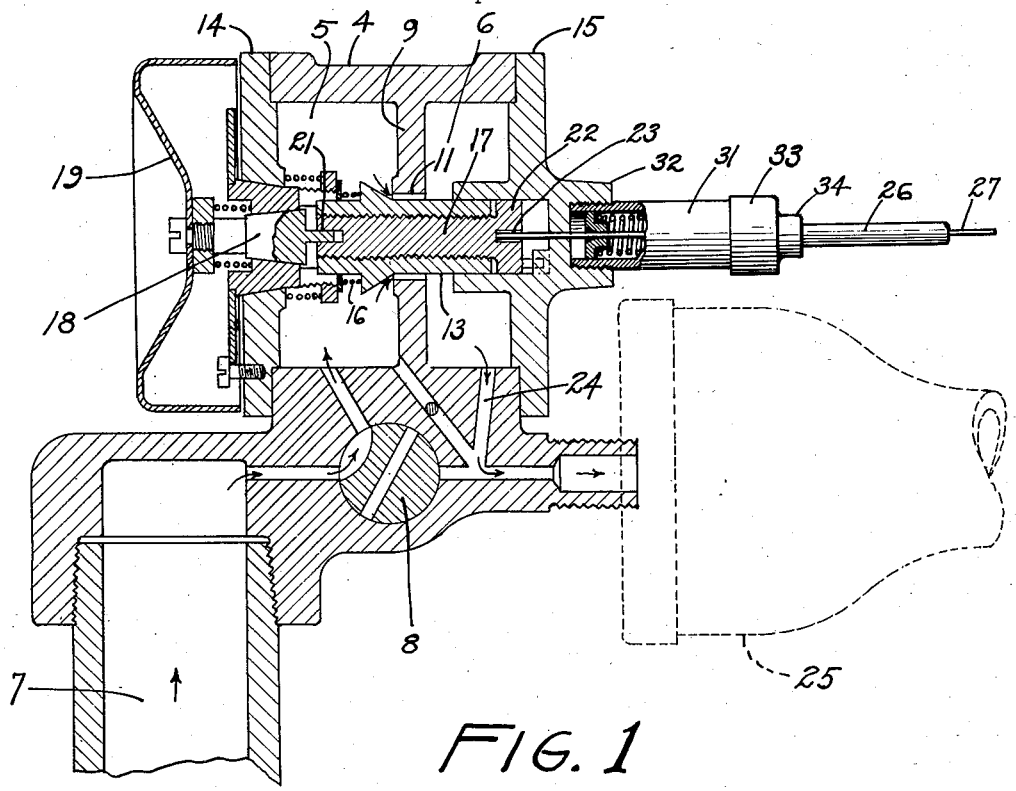
Figure 1 is a horizontal sectional view of a gas valve showing the novel mechanism associated therewith.

The gas control valve here shown is one particularly adapted for use for the thermostatic control of oven burners. Such valve is shown as comprising a housing 4 having inlet and outlet chambers 5 and 6 and a supply pipe or manifold 7. The usual manually operable valve plug 8 is shown, by means of which the gaseous flow from the manifold 7 to the inlet chamber 5 may be regulated. A web 9 separates the inlet and outlet chambers from each other. This web is provided with a central aperture 11 the front edge of which forms a seat adapted to coact with a conoidal valve 12 provided upon a sleeve 13 which is slidably mounted in suitable bearings provided in the front and rear plates 14 and 15, respectively, of the valve housing 4. The valve 12 is yieldably held against its seat by means of the spring 16. A threaded shaft or stem 17 is concentrically mounted in the sleeve 13 and is adapted to be rotated therein by means of the plug 18 and dial wheel 19. The sleeve 13 is prevented from rotation by means of the slot and tongue connection 21. The shaft 17 has a head 22 formed at one end which is provided with a suitable socket 23 adapted to receive the free end of a flexible element of the thermostatic mechanism. When the valve 12 is in open position, as indicated in Figure 1, the gas will flow from the inlet chamber 5 through the aperture 11 around the sleeve 13 and into the outlet chamber 6, from whence it will be conducted through a port 24 to the usual burner mixer 25.

Figure 3:
Figure 3 is a view in side elevation of the oven-end portion of the thermostatic element and tube, with the tube partially broken away to show the fixed relation of such ends of the element and member.

The position of the valve is adapted to be controlled thermostatically and in the form of control here shown there is provided a tubular member and a flexible element having different coefficients of expansion for the same temperature changes. The flexible member is adapted to extend longitudinally within the tubular member, preferably with a running guiding bearing therein and, to be fixed at one end thereto while the other end of the element freely projects beyond the tubular member for working connection with the movable part of the valve. There is here shown an elongated member or tube 26 adapted to bear a flexible element or wire 27. The tube may be of brass which has a relatively high coefficient of expansion while the wire may be of steel having a relatively low one. However, an alloy of steel, having a relatively low coefficient of expansion coupled with non-corrosive attributes, may be employed. The relation of the inside diameter of the tube to the outside diameter of the wire is such that the wire is, at least, provided with a running guiding fit. The wire 27 is flexible in order that the tube may be arcuately curved when installed, both to assure presentation of sufficient length within an oven and to permit the wire to extend to, and directly contact with, the parts to be actuated. The working wire 27 is fixedly secured to the top at one end and freely projects therefrom at its other end. A means of fixedly securing one end of the wire 27 to the tube 26 is shown in Figure 3 wherein a terminal portion of the wire is upset to form an enlarged head 28 to effect a driving fit within the tube interior. This head terminates through one end of the tube so that brazing metal 29 may be received therein to assure a fixed and gas-tight connection of wire and tube at this oven end. Thus, any differential of expansion or contraction must be communicated to the free end of the working wire which terminally projects from the other end of the tube and the resultant relative movement may be employed to actuate the movable part of a valve.

Figure 2:
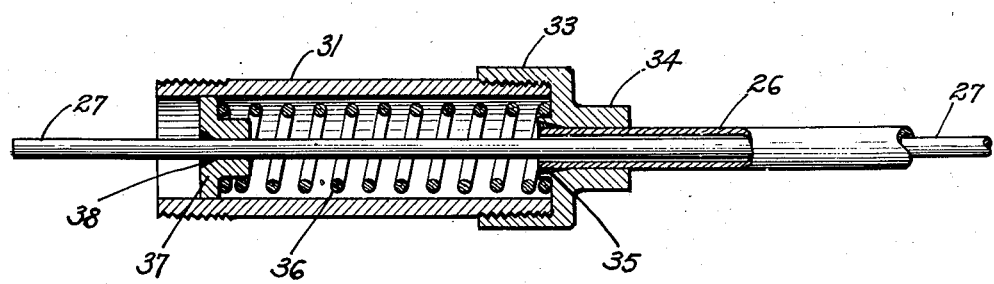
Figure 2 is an enlarged detailed sectional view of the valve end of a novel thermostatic mechanism.

The valve-end of the tube is provided with a means for fixedly coupling the tube to the fixed portion of the valve such as the housing. As here shown, a cylindrical coupling 31 is preferably received in threaded engagement within a suitable boss 32 provided upon the rear plate 15. The other end of the coupling 31 is also terminally threaded to receive a cap 33. This cap is provided with a boss 34 adapted to receive therein the valve-end of the tube 26, the end portion of which is fixedly secured to the cap. As is shown in Figure 2, the inner face of the cap 33 is preferably counter-sunk or provided with a tapered bore in order to provide a space to receive a suitable brazing metal 35 by means of which a fixed and gas-tight connection, between the tube and key, is assured.

In this novel structure, means are employed for overcoming any tendency of the flexible element to slackness which might impair the accurate responsiveness of the wire to thermo changes. The specific form here shown, consists of tension means such as the compression spring 36. Such spring may be conveniently mounted within the coupling 31 and coiled about the wire 27 which projects therethrough. One end of the spring 36 is shown as held against the inside face of the relatively fixed cap 33 while the compressive force of the spring is communicated to the flexible wire 27 by means of a flanged collar 37 which is secured to the wire 27 adjacent its free end. Such fixed connection may be simply obtained by means of brazing metal 3£. The relation of the outside diameter of this collar to the inside diameter of the cylindrical coupling is such as to provide a running guiding fit for the collar within the coupling. The fixed wire 27 is therefore placed under constant tension yieldably to hold the projecting or working end of the wire 27 outwardly from the tube and against the bottom of the socket 23 provided in the head 22 of the valve shaft 17. Thus, in normal operation, when the burner is lighted and the dial 19 is set for a predetermined oven temperature, the rising temperature in the oven creates an expansion differential between the wire 27 and the tube 26 which gradually draws the wire 27 within the tube 26 against the compression spring 36, whereby the valve 12 is gradually forced toward its seat to diminish or cut off the flow of combustible gas to the oven burner. On the other hand, when the oven cools below the predetermined temperature, the expansion differential between the tube and wire causes the wire to be forced out of the tube against the end of the socket 23 so that the valve 12 is moved to a more widely open position.

During these relative movements of the wire and tube due to thermal changes, it is advantageous that no part of the wire be permitted to buckle or become slack or be permitted to shift its relative position within the tube particularly at curves or bend thereof. Such changes or movements of portions of the wire might impair the accurate responsiveness of the wire to temperature changes, and as this mechanism is intended for accurately responsive work, this novel structure constitutes a valuable improvement.

Having thus described my invention what I claim as new and desire to secure by Letters Patent, is:

1. In a thermostatic mechanism, the combination of a tubular member, a flexible element having a different coefficient of expansion extending longitudinally of and having a running guiding fit within said member, one end of the member and of the element being secured together so that the other portions thereof may have relative movement upon temperature changes, and means associated with said element to overcome any tendency to slackness of said element whereby a more accurate responsive thermostatic movement of said mechanism is obtained.

2. In a thermostatic mechanism, the combination of a tubular member, a flexible element having a different coefficient of expansion extending longitudinally of and having a running guiding fit within said member, one end of the member and of the element being secured together so that the other portions thereof may have relative movement upon temperature changes, and tension means associated with said element to overcome any tendency to slackness of said element whereby a more accurate responsive thermostatic movement of said mechanism is obtained.

3. In a thermostatic mechanism, the combination of a tubular member adapted to be shaped into a curved or irregular form, a flexible element having a different coefficient of expansion extending longitudinally of and having a running guiding fit within said member, one end of the member and of the element being secured together so that the other portions thereof may have relative movement upon temperature changes whereby the mechanism may thermostatically function when assuming a curvilinear or irregular path, and tension means associated with said element to overcome any tendency to slackness of said element whereby a more accurately responsive thermostatic movement of said mechanism is obtained.

4. In a thermostatic mechanism, the combination of a tubular member, a flexible element having a different coefficient of expansion extending longitudinally of and having a running guiding fit within said member, one end of the member and of the element being secured together so that the other portions thereof may have relative movement upon temperature changes, and tension means connected to said member and element adjacent the other ends of the element and member and operably tending to draw the element from the member whereby any tendency to slackness of the element is overcome and an accurately responsive thermostatic control is obtained.

5. In a thermostatic mechanism, the combination of a tubular member, a flexible element having a different coefficient of expansion extending longitudinally of and having a running guiding fit within said member, said element having a substantially free end and its other end secured to the adjacent end of said member so that the major portions of the member and element may have relative movement upon temperature changes, a device adapted to be thermostatically controlled and including relatively fixed and movable parts, means for fixedly securing the end portion of said member opposite its element-connected end to a fixed part of said device, said free end of the element being adapted to control the movement of the movable part of said device, and tension means fixedly held at one end and operatively connected to the free end of said element to overcome any tendency to slackness of said flexible element whereby a more accurately responsive thermostatic control is obtained.

In witness whereof, I have hereunto set my hand this 20 day of Apr. 1923.

CHARLES R. CARPENTER.